US008417439B2

(12) United States Patent
Christian et al.

(10) Patent No.: US 8,417,439 B2
(45) Date of Patent: Apr. 9, 2013

(54) SYSTEM FOR IMPROVING ENGINE PERFORMANCE AND EMISSIONS

(75) Inventors: Adam Michael Christian, Garden City, MI (US); Jeff Chester Lyjak, Ann Arbor, MI (US); Beth Ann Dalrymple, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 12/830,112

(22) Filed: Jul. 2, 2010

(65) Prior Publication Data
US 2011/0139104 A1   Jun. 16, 2011

(51) Int. Cl.
*G06F 19/00*   (2011.01)
(52) U.S. Cl.
USPC .............................. 701/112; 123/54.7; 60/313
(58) Field of Classification Search .................. 701/112, 701/103; 123/54.7; 60/597, 605.1, 312, 60/313, 322, 323
See application file for complete search history.

(56) References Cited

U.S. PATENT DOCUMENTS

| 3,726,084 | A | | 4/1973 | Meier et al. |
| 3,768,248 | A | | 10/1973 | Grgurich et al. |
| 4,197,704 | A | * | 4/1980 | Date et al. ........................ 60/322 |
| 5,392,601 | A | | 2/1995 | LeVine |
| 5,471,835 | A | | 12/1995 | Friedman |
| 5,660,154 | A | * | 8/1997 | Fields ........................ 123/184.42 |
| 5,692,375 | A | * | 12/1997 | Novak et al. ..................... 60/323 |
| 5,822,986 | A | * | 10/1998 | Higashide ........................ 60/313 |
| 6,062,024 | A | * | 5/2000 | Zander et al. ..................... 60/597 |
| 6,405,693 | B2 | | 6/2002 | Yoeda et al. |
| 6,840,887 | B2 | | 1/2005 | Hrovat et al. |
| 6,959,692 | B2 | | 11/2005 | Song et al. |
| 7,213,550 | B2 | | 5/2007 | Nishida |
| 7,921,709 | B2 | * | 4/2011 | Doering et al. ............. 73/114.79 |
| 2003/0056502 | A1 | | 3/2003 | Katayama et al. |

* cited by examiner

*Primary Examiner* — John Kwon
(74) *Attorney, Agent, or Firm* — Julia Voutyras; Alleman Hall McCoy Russell & Tuttle LLP

(57) ABSTRACT

A system for improving engine performance and emissions is presented. The system can lower exhaust pressure and improve engine breathing. In one example, exhaust gases are combined to reduce exhaust pressure during exhaust valve overlap.

20 Claims, 10 Drawing Sheets

SYSTEM FOR IMPROVING ENGINE PERFORMANCE AND EMISSIONS

FIELD

The present description relates to a system for improving performance, fuel economy, and emissions of an engine. The system may be particularly useful for engines of a V configuration.

BACKGROUND AND SUMMARY

Engine air flow can be affected by engine system components on both the intake side and the exhaust side of engine cylinders. For example, engine exhaust manifolds can affect exhaust back pressure, cylinder mixture, and engine emissions. On the other hand, charge motion control valves, variable cam timing devices, and intake manifold design can affect engine air flow from the intake side of engine cylinders. If the engine system provides increased exhaust back pressure, engine efficiency may decrease while engine emissions may increase. In U.S. Pat. No. 5,822,986, an engine system having exhaust manifolds that separate cylinder exhaust discharge between engine cylinders by 270 or more crankshaft degrees is disclosed. This engine system purports to reduce exhaust gas interference between engine cylinders.

The above-mentioned method can also have several disadvantages. Specifically, the system applies to a four-stroke V-eight engine that has a firing order of 1-3-7-2-6-5-4-8. However, the firing order may not be perceived as smooth as other firing orders. Further, the exhaust manifold may not function as well with engines having different firing orders that may be perceived as smoother. Further still, the described exhaust manifold may only provide improved engine performance and emissions in a limited engine operating range.

The inventors herein have recognized the above-mentioned disadvantages and have developed an engine system for improving engine fuel economy, performance, and emissions.

One example of the present description includes an engine system, comprising: an exhaust manifold including a first Y-pipe, said first Y-pipe including a first pipe and a second pipe, said first pipe and said second pipe coupled to a confluence pipe, said first pipe extending to solely engage exhaust ports of first and second cylinders of an engine cylinder bank, said second pipe extending to solely engage exhaust ports of third and fourth cylinders of said engine bank, said first and second cylinders 90 crankshaft degrees apart in an engine firing order.

By closely coupling the exhaust of cylinders that are 90 crankshaft degrees apart in an engine firing order, it is possible to reduce engine exhaust back pressure and improve engine air flow for engines having combustion orders that may be perceived smoother. Further, engine emissions may be reduced because exhaust gases from cylinders that are close in an engine firing may take a more direct path to an engine after treatment device. Consequently, engine emissions may be reduced by earlier activation of exhaust after treatment devices.

In another example, the present description provides for an engine system, comprising: an engine including a camshaft with at least one intake valve lobe having an intake valve opening duration of at least 260 crankshaft degrees; and a mid-position locking camshaft phasor coupled to said camshaft and configured to adjust a cam timing of a cylinder bank of said engine; and an exhaust manifold coupled to said engine and including a first Y-pipe, said first Y-pipe including a first pipe and a second pipe, said first pipe and said second pipe coupled to a confluence pipe, said first pipe extending to solely engage exhaust ports of first and second cylinders of said engine cylinder bank, said second pipe extending to solely engage third and fourth cylinders of said engine bank, said first and second cylinders 90 crankshaft degrees apart in an engine firing order.

Engine air flow and emissions can be improved by an engine system that synergistically combines cylinder intake air control with an exhaust manifold that lowers exhaust back pressure. In particular, charge motion control valves and variable cam timing can improve engine breathing when an exhaust system can combine exhaust from engine cylinders that are separated by 90 crankshaft degrees in an engine combustion order.

The present description may provide several advantages. In particular, the approach may improve engine performance by lowering exhaust backpressure for an engine having a different firing order. Further, the present description may improve engine emissions by increasing heat flux to engine after treatment devices during an engine start. Further still, the present description may provide improved engine performance over a wider engine operating range.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
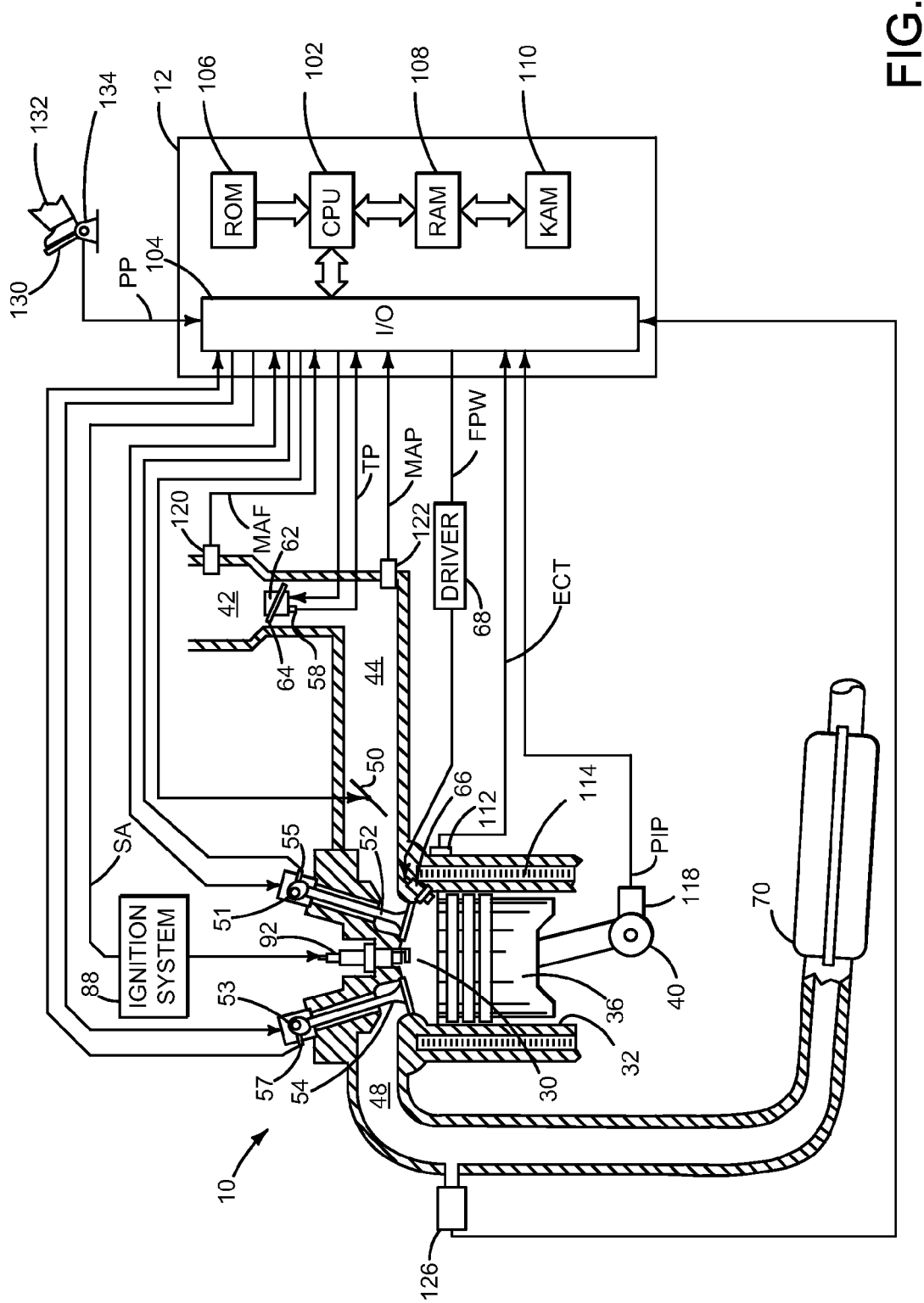
FIG. 1 is a schematic diagram of an engine.
Figure 2:
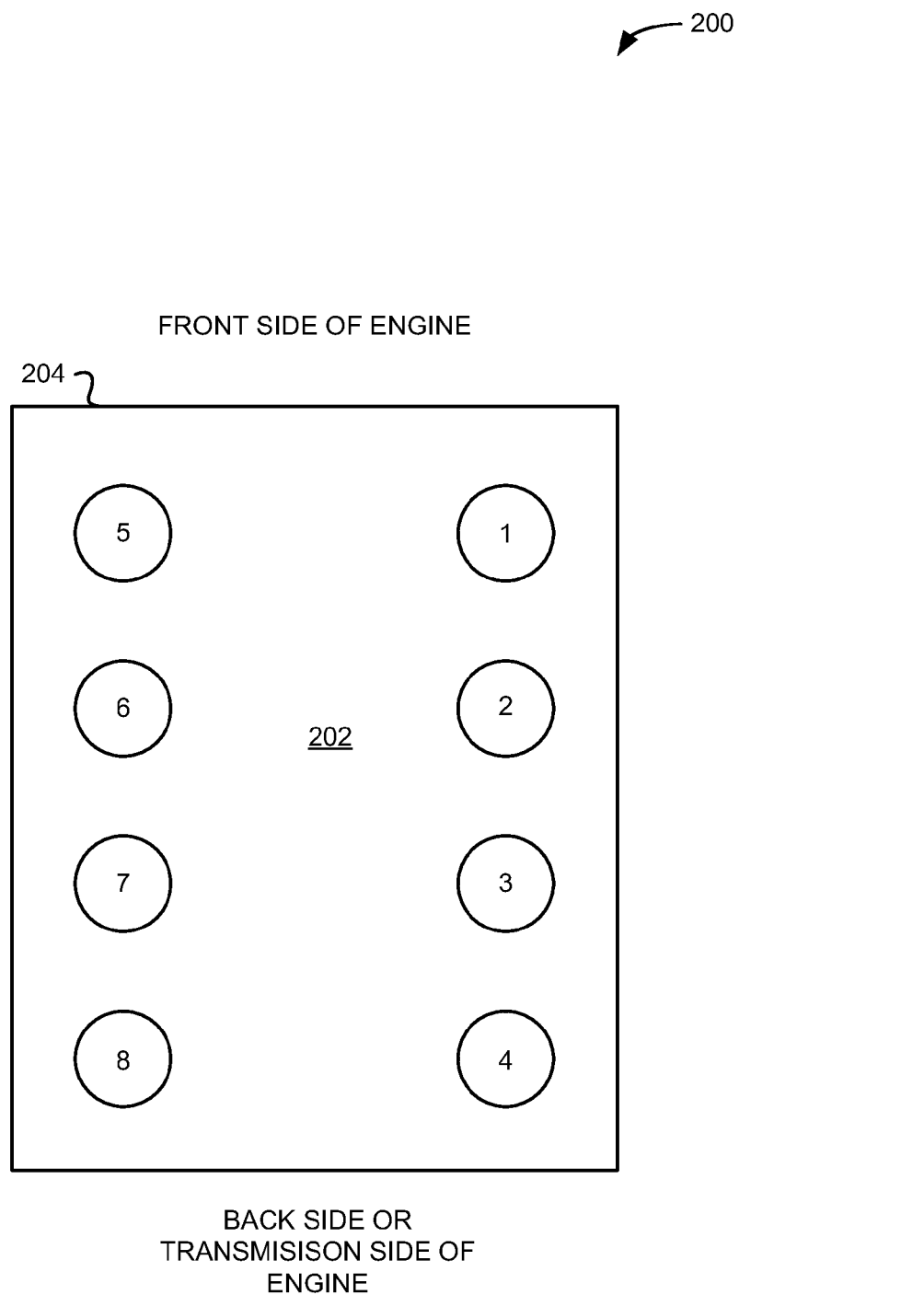
FIG. 2 is a plan view schematic diagram of an engine cylinder numbering configuration.
Figure 3:
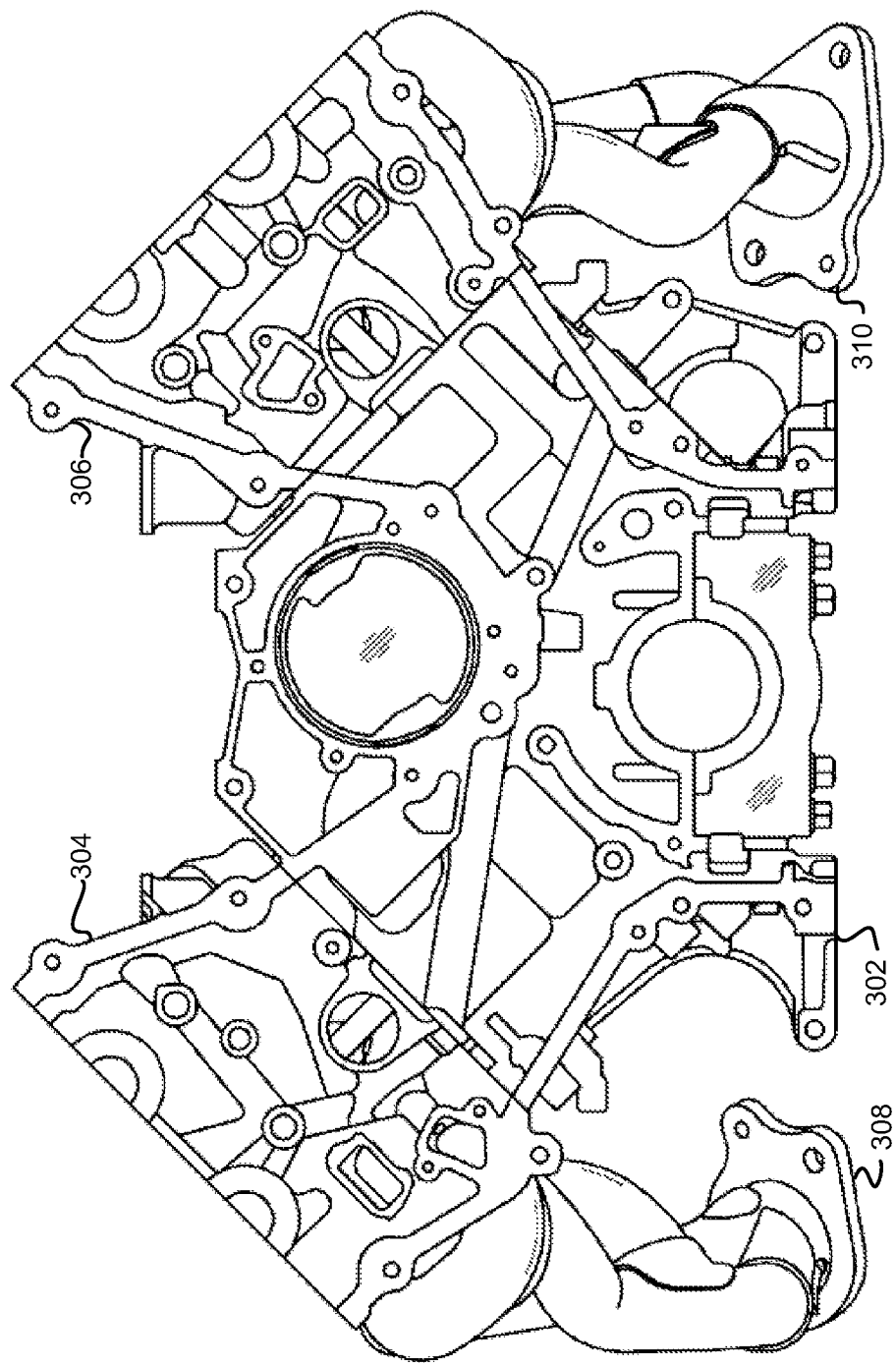
FIG. 3 is a schematic diagram of example exhaust manifolds coupled to cylinder heads of an engine.
Figure 13:
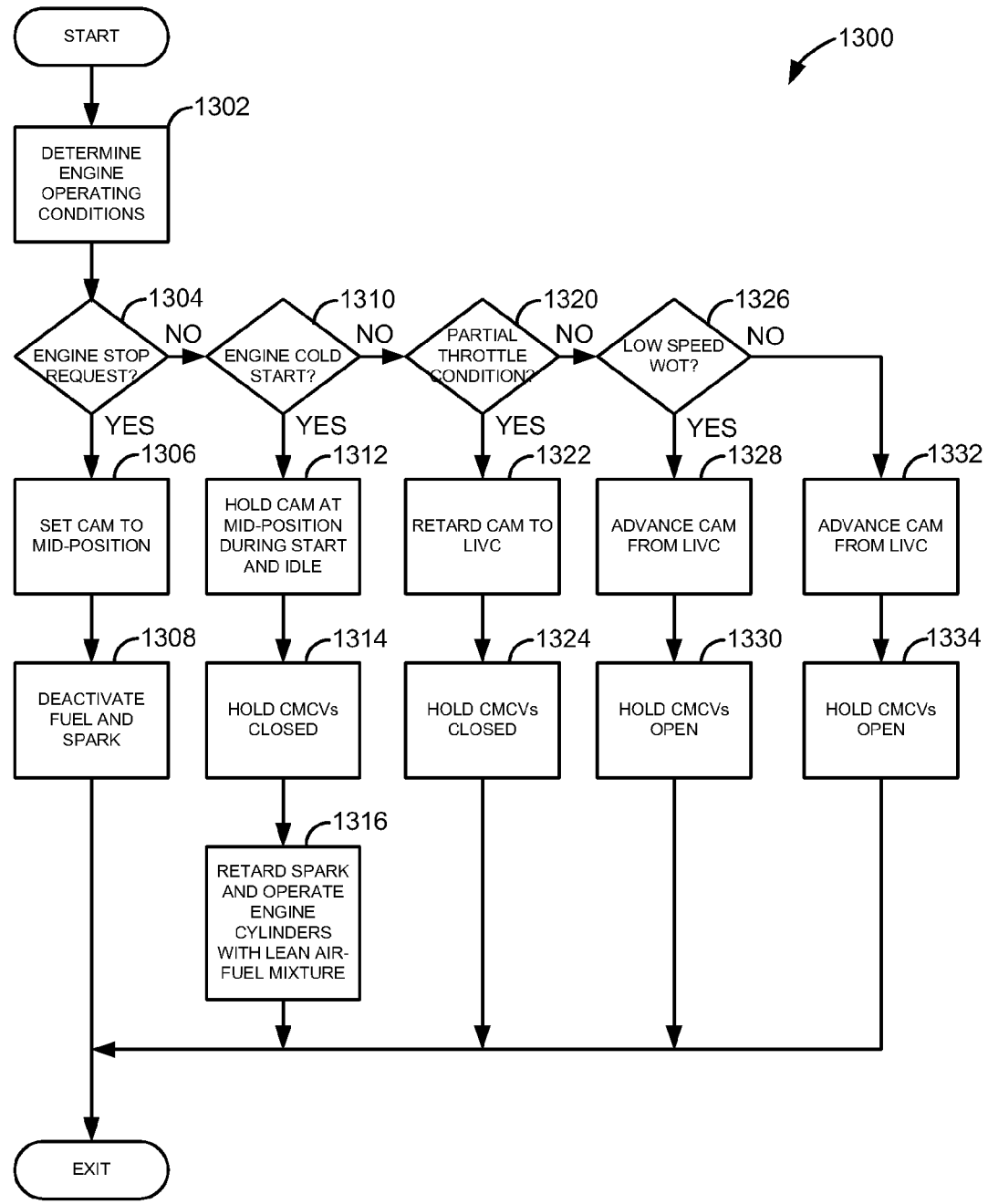
FIG. 13 is a plot of a flowchart of a method for operating an engine.

The present description is related to controlling cylinder air flow of an internal combustion engine. In one embodiment, an eight cylinder engine as shown in FIGS. 1-3 and having exhaust manifolds as shown in FIGS. 4-7 improves engine air flow. FIG. 13 shows a method for controlling engine air flow during different engine operating conditions.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. Intake manifold 44 includes charge motion control valve 50 for controlling charge motion within cylinder 30. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-dir Hall sensor or equivalent, the engine position may be maintained through shut-down, but during re-start alternative strategy may be used to assure that the engine is rotating in a forward direction.

Thus, the system of FIG. 1 provides for an engine system, comprising: an exhaust manifold including a first Y-pipe, said first Y-pipe including a first pipe and a second pipe, said first pipe and said second pipe coupled to a confluence pipe, said first pipe extending to solely engage exhaust ports of first and second cylinders of an engine cylinder bank, said second pipe extending to solely engage exhaust ports of third and fourth cylinders of said engine bank, said first and second cylinders 90 crankshaft degrees apart in an engine firing order. In one example, the engine system includes where said first pipe branches into a second Y-pipe before engaging exhaust ports of said first and second cylinders, and where said confluence pipe is coupled to a pipe including a catalyst. The engine system also includes wherein said second pipe branches into a third Y-pipe before engaging exhaust ports of said third and fourth cylinders, and wherein said third and fourth cylinders are 270 crankshaft degrees apart in said engine firing order. The engine system further includes wherein said first pipe is a confluence pipe of a third pipe and a fourth pipe. The engine system also includes where said second pipe is a confluence pipe of a fifth pipe and a sixth pipe. The engine system also includes wherein said first pipe and said second pipe are configured to direct engine exhaust in a direction from a front of an engine to a rear of said engine, and wherein said third pipe and said fourth pipe are combined into said first pipe at a location before said first pipe reaches a location of a third cylinder while said first pipe extends to said rear of said engine. In another example, the engine system further comprises an intake cam having an intake valve opening duration of at least 260 crankshaft degrees, said intake cam capable of opening valves that direct cylinder contents to said exhaust manifold. In another example the engine system further comprises a charge motion control valve and a mid-locking position camshaft phase actuator, said charge motion control valve and said mid-locking position camshaft phase actuator adjusting flow to cylinders in communication with said exhaust manifold.

Further, the system of FIG. 1 provides for an engine system, comprising: an engine including a camshaft with at least one intake valve lobe having an intake valve opening duration of at least 260 crankshaft degrees; and a mid-position locking camshaft phasor coupled to said camshaft and configured to adjust a cam timing of a cylinder bank of said engine; and an exhaust manifold coupled to said engine and including a first Y-pipe, said first Y-pipe including a first pipe and a second pipe, said first pipe and said second pipe coupled to a confluence pipe, said first pipe extending to solely engage exhaust ports of first and second cylinders of said engine cylinder bank, said second pipe extending to solely engage third and fourth cylinders of said engine bank, said first and second cylinders 90 crankshaft degrees apart in an engine firing order. The engine system further comprises a controller, said controller configured with instructions to lock said camshaft in a mid-position during an engine stop. In another example, the engine system further comprises a charge motion control valve for controlling air flow to said engine cylinder bank. The engine system also includes wherein said controller includes further instructions for closing said charge motion control valve during engine idle conditions and opening said charge motion control valve during wide open throttle conditions. The engine system also includes wherein a diameter of said first pipe is greater than a diameter of said third pipe, and wherein a diameter of said first pipe is greater than a diameter of said fourth pipe. In one example, the engine system includes wherein said exhaust manifold is coupled to an eight cylinder V type engine.

The system of FIG. 1 also provides for an engine system, comprising: an engine including a camshaft with at least one intake valve lobe having an intake valve opening duration of at least 260 crankshaft degrees; a mid-position locking camshaft phasor coupled to said camshaft and configured to adjust a cam timing of a cylinder bank of said engine; a first exhaust manifold coupled to said engine and including a first Y-pipe, said first Y-pipe including a first pipe and a second pipe, said first pipe and said second pipe coupled to a confluence pipe, said first pipe extending to solely engage exhaust ports of first and second cylinders of an engine cylinder bank, said second pipe extending to solely engage third and fourth cylinders of said engine bank, said first and second cylinders 90 crankshaft degrees apart in an engine firing order; and a second exhaust manifold coupled to said engine and including a first Y-pipe, said first Y-pipe including a first pipe and a second pipe, said first pipe and said second pipe coupled to a confluence pipe, said first pipe extending to solely engage exhaust ports of first and second cylinders of an engine cylinder bank, said second pipe extending to solely engage third and fourth cylinders of said engine bank, said first and second cylinders 270 crankshaft degrees apart in said engine firing order, said third and fourth cylinders 270 crankshaft degrees apart in said engine firing order. In one example, the engine system further comprises a controller, wherein said controller includes instructions for locking said mid-position locking camshaft phasor in a mid-position during an engine stop. The engine system also includes wherein said controller includes further instructions for holding said mid-position locking camshaft in said mid-position during a cold start idle condition, said controller including further instructions for retarding said mid-position locking camshaft from said mid-position during a warm idle condition. The engine system also includes wherein said controller includes further instructions for opening a charge motion control valve during at wide open throttle conditions. The engine system also further comprises a charge motion control valve for controlling air flow to said engine cylinder bank. The engine system also includes wherein said controller includes further instructions for holding a charge motion control valve closed during at least some part load conditions.

Referring now to FIG. 2, a plan view schematic diagram of an engine cylinder numbering configuration is shown. Engine 200 includes engine block 202 housing eight cylinders numbered 1-8 as referenced to engine front 204. Engine 200 is configured to accommodate exhaust manifolds as shown in FIGS. 3-7 and is suitable for being controlled according to the method of FIG. 13. Engine front 204 may include an accessory drive for operating ancillary devices such as compressors and alternators. In this example, the engine cylinder numbering begins on the right-hand side of engine block 202 and proceeds in a downward direction until cylinder number 4. Cylinders numbered 1-4 comprise a first cylinder bank. Cylinder number 5 is at the upper left-hand side of engine block 202. Cylinders 6-7 proceed in a downward direction from cylinder 5. Cylinders 5-8 comprise a second cylinder bank. Engine 200 is a V-eight engine having a firing order of 1-5-4-8-6-3-7-2. Consequently, there are 90 crankshaft degrees between similar events of cylinders (e.g. combustion events) that are adjacent in the firing order. For example, when engine cylinder number two reaches top-dead-center compression stroke, engine cylinder number one will reach top-dead-center compression stroke 90 crankshaft angle degrees later.

Referring now to FIG. 3, a schematic diagram of example exhaust manifolds coupled to cylinder heads of an engine is shown. Cylinder heads 304 and 306 are coupled to engine block 302. At the left side of FIG. 3, right-hand exhaust manifold 308 is coupled to right cylinder head. At the right side of FIG. 3, left-hand exhaust manifold 310 is coupled to left cylinder head. Right-hand exhaust manifold 310 and left-hand exhaust manifold 308 direct exhaust gases away from cylinder heads 304 and 306.

Figure 4:
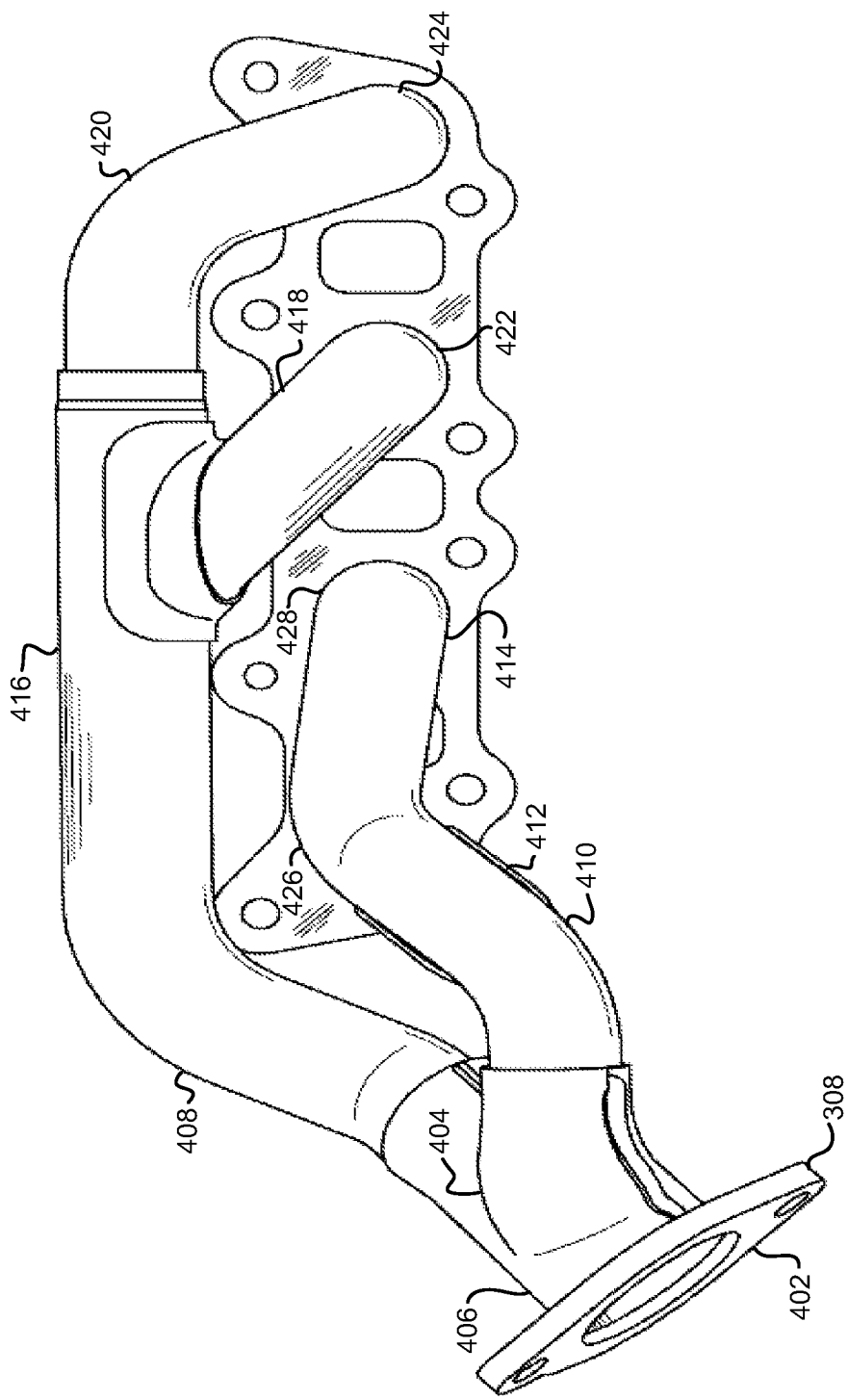
FIG. 4 is a schematic diagram of a side view of a right-hand exhaust manifold.

Referring now to FIG. 4, a schematic diagram of a side view of right-hand exhaust manifold is shown. In particular, the exhaust manifold of FIG. 4 is an isolated view of exhaust manifold 308 shown in FIG. 3. Right-hand exhaust manifold 308 has a flange 402 that is coupled to a first Y-pipe 404. The first Y-pipe 404 includes a first confluence pipe 406 where exhaust gases from a first pipe 408 and a second pipe 410 combine before leaving exhaust manifold 308 at flange 402. First pipe 408 extends into solely engage engine exhaust ports at 422 and 424.

First pipe 408 begins by branching from confluence pipe 406, and first pipe 408 becomes a second confluence pipe for third 418 pipe and fourth 420 pipe. Fourth pipe 420 is configured to solely engage the exhaust port of cylinder number one of an engine at 424. Third pipe 422 is configured to solely engage the exhaust port of cylinder number two of an engine at 422. The combustion order of an engine which exhaust manifold 308 is coupled to is 1-5-4-8-6-3-7-2. Consequently, third pipe 422 and fourth pipe 420 are coupled to exhaust ports of engine cylinders number one and two which are separated by 90 crankshaft degrees of engine rotation. Confluence area 416 of first pipe 408 has a larger diameter than exhaust pipes three and four. In particular, the cross-sectional are of first pipe 408 is more than 30% greater than the cross-sectional area of pipes three and four.

Second pipe 410 begins by branching from first confluence pipe 406, and second pipe 410 becomes a third confluence pipe for fifth pipe 412 and sixth 414 pipe. Fifth pipe 412 is configured to solely engage the exhaust port of cylinder number four of an engine at 426. Sixth pipe 414 is configured to solely engage the exhaust port of cylinder number three of an engine at 428. Thus, fifth pipe 412 and sixth pipe 414 are coupled to exhaust ports of engine cylinders number three and four which are separated by 270 crankshaft degrees of engine rotation.

Figure 5:
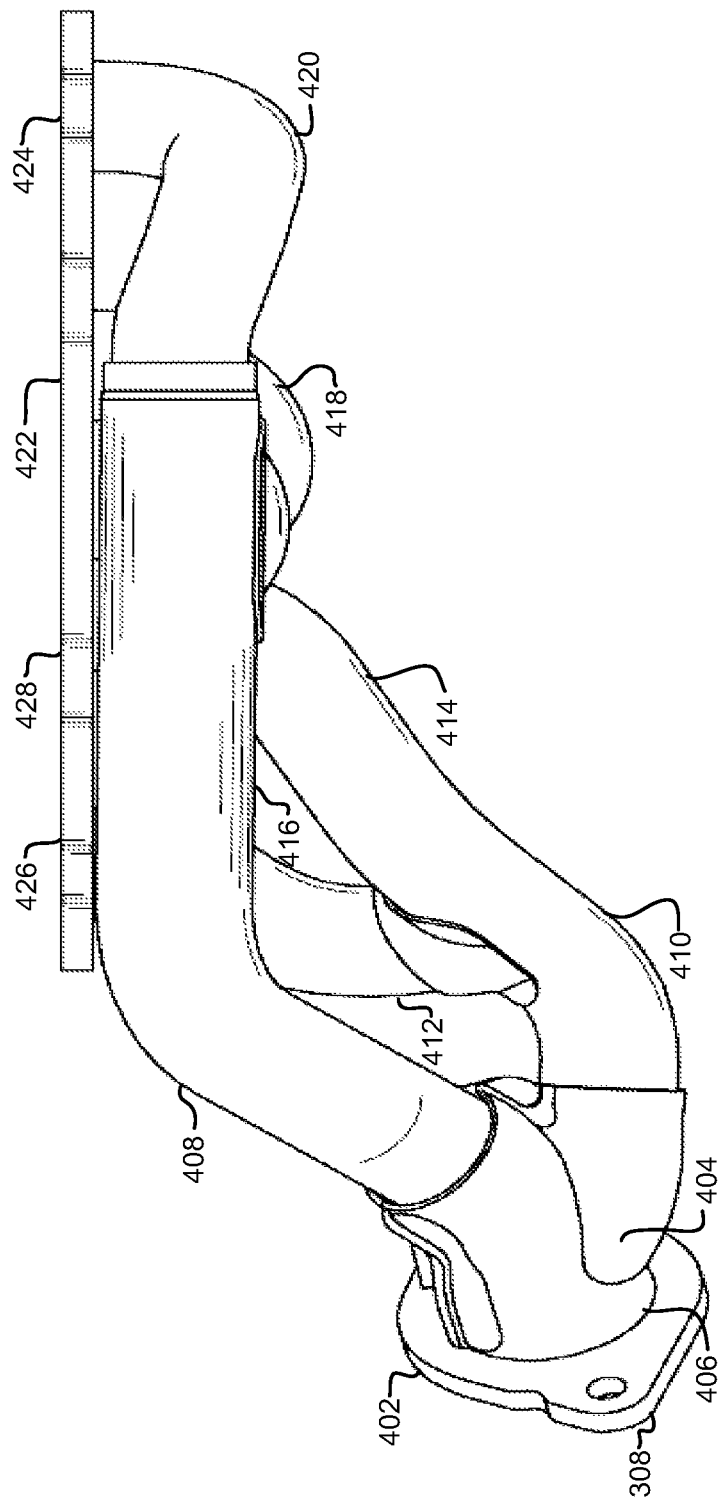
FIG. 5 is a schematic diagram of a plan view of the top of a right-hand exhaust manifold.

Referring now to FIG. 5, a schematic diagram of a plan view of the top of a right-handed exhaust manifold is shown. In particular, the exhaust manifold of FIG. 5 is an isolated top view of exhaust manifold 308 shown in FIG. 3. Exhaust manifold 308 includes flange 402 for coupling exhaust manifold 308 to an exhaust pipe including a catalyst. First Y-pipe 404 is shown including first confluence pipe 406, first pipe 408 and second pipe 410. A portion of first pipe 408 extends along the length of cylinder head exhaust port inlets 426, 428, 422, and 424. First pipe 408 includes confluence area 416 and branches into third pipe 418 and fourth pipe 420. Fourth pipe 420 is configured to engage engine cylinder number one exhaust at 424. Third pipe 418 is configured to engage engine cylinder number two exhaust at 422. Second pipe 410 is shown including fifth pipe 412 and sixth pipe 414. Thus, FIGS. 4-5 show a compact exhaust manifold that provides low exhaust back pressure and high heat flux capacity.

Figure 6:
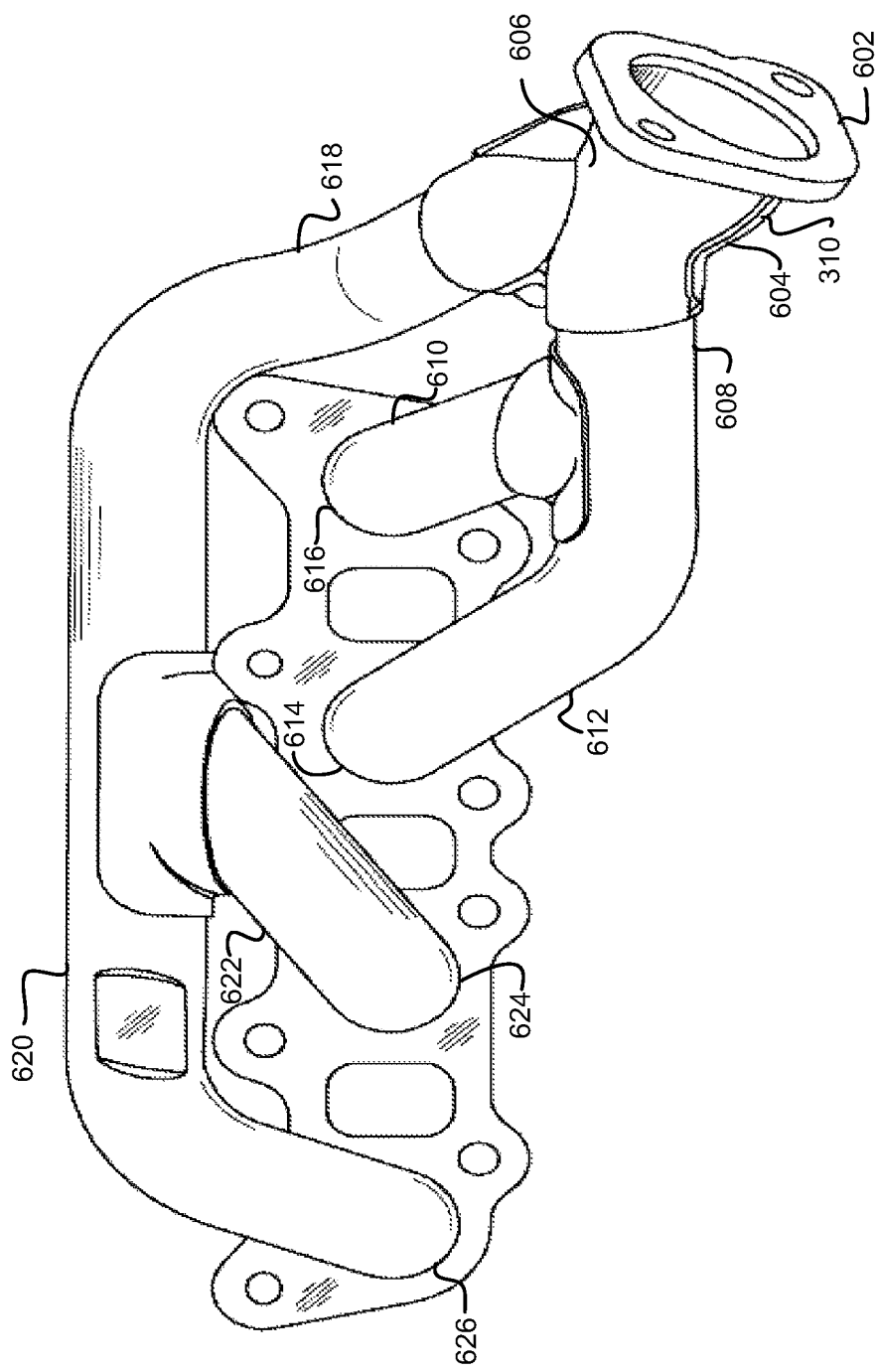
FIG. 6 is a schematic diagram of a side view of a left-hand exhaust manifold.

Referring now to FIG. 6, a schematic diagram of a side view of left-hand exhaust manifold is shown. In particular, the exhaust manifold of FIG. 6 is an isolated view of exhaust manifold 310 shown in FIG. 3. Left-hand exhaust manifold 310 has a flange 602 that is coupled to a first Y-pipe 604. The first Y-pipe 604 includes a first confluence pipe 606 where exhaust gases from a first pipe 618 and a second 608 combine before leaving exhaust manifold 310 at flange 602. First pipe 618 extends into solely engage engine exhaust ports at 626 and 624.

First pipe 618 begins by branching from first confluence pipe 606, and first pipe 618 becomes a second confluence pipe for third pipe 620 and fourth pipe 622. Fourth pipe 622 is configured to solely engage the exhaust port of cylinder number six of an engine at 624. Third pipe 620 is configured to solely engage the exhaust port of cylinder number five of an engine at 626. The combustion order of an engine which exhaust manifold 310 is coupled to is 1-5-4-8-6-3-7-2. Consequently, third pipe 620 and fourth pipe 622 are coupled to exhaust ports of engine cylinders number five and six which are separated by 270 crankshaft degrees of engine rotation.

Second pipe 608 begins by branching from first confluence pipe 606, and second pipe 608 becomes a third confluence pipe for fifth pipe 610 and sixth pipe 612. Fifth pipe 610 is configured to solely engage the exhaust port of cylinder number eight of an engine at 616. Sixth pipe 612 is configured to solely engage the exhaust port of cylinder number seven of an engine at 614. Thus, fifth pipe 610 and sixth pipe 612 are coupled to exhaust ports of engine cylinders number seven and eight which are separated by 270 crankshaft degrees of engine rotation.

Figure 7:
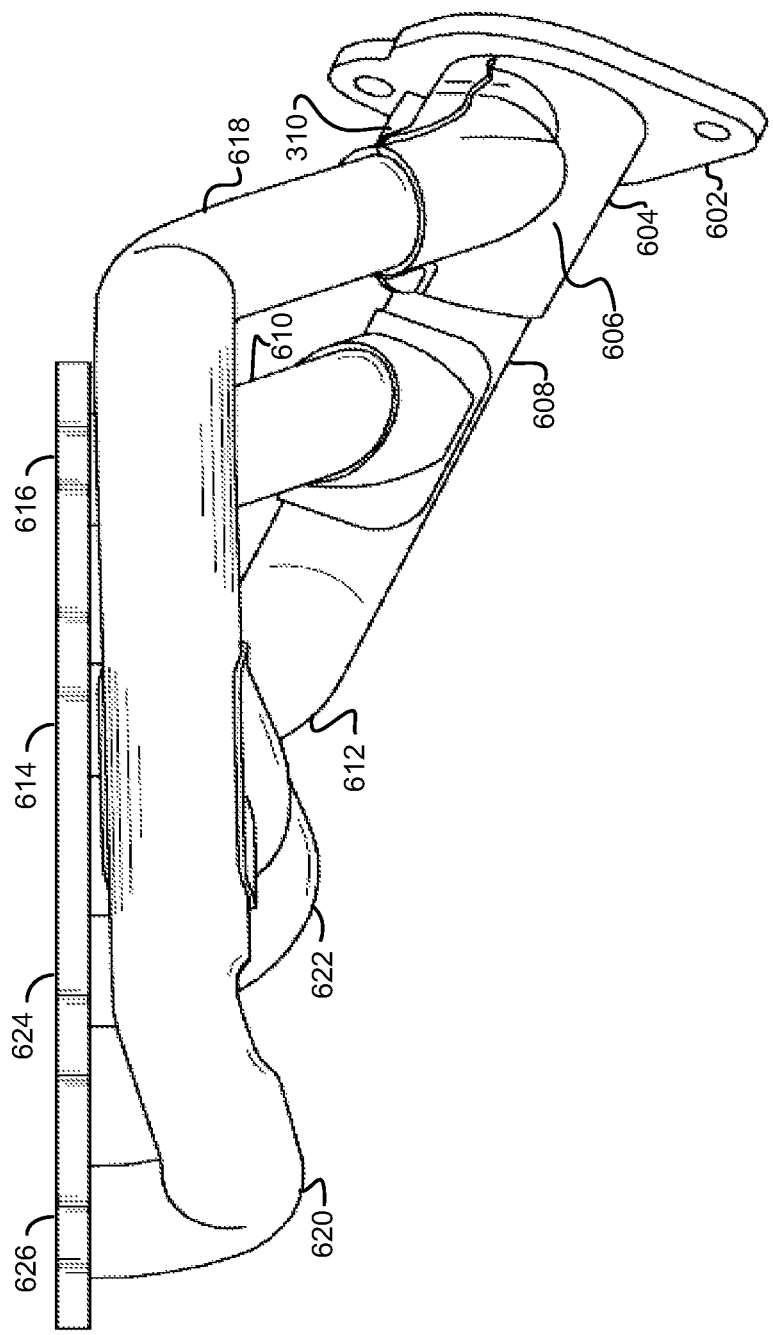
FIG. 7 is a schematic diagram of a plan view of a left-hand exhaust manifold.

Referring now to FIG. 7, a schematic diagram of a plan view of the top of a left-handed exhaust manifold is shown. In particular, the exhaust manifold of FIG. 6 is an isolated top view of exhaust manifold 310 shown in FIG. 3. Exhaust manifold 310 includes flange 602 for coupling exhaust manifold 310 to an exhaust pipe including a catalyst. First Y-pipe 604 is shown including first confluence pipe 606, first pipe 618 and second pipe 608. A portion of first pipe 618 extends in along the length of cylinder head exhaust port inlets 626, 624, 614, and 616. First pipe 618 branches into third pipe 620 and fourth pipe 622. Fourth pipe 622 is configured to engage engine cylinder number six exhaust at 624. Third pipe 620 is configured to engage engine cylinder number five exhaust at 626. Second pipe 608 is shown including fifth pipe 610 and sixth pipe 612. Thus, FIGS. 6-7 show a compact exhaust manifold that provides low exhaust back pressure and high heat flux capacity.

FIGS. 8-11 show cylinder exhaust port pressure traces for an engine with a firing order of 1-5-4-8-6-3-7-2. The pressure traces of FIGS. 8-11 show the pressure reduction possible with the exhaust manifold as described in FIGS. 4-5.

Figure 8:
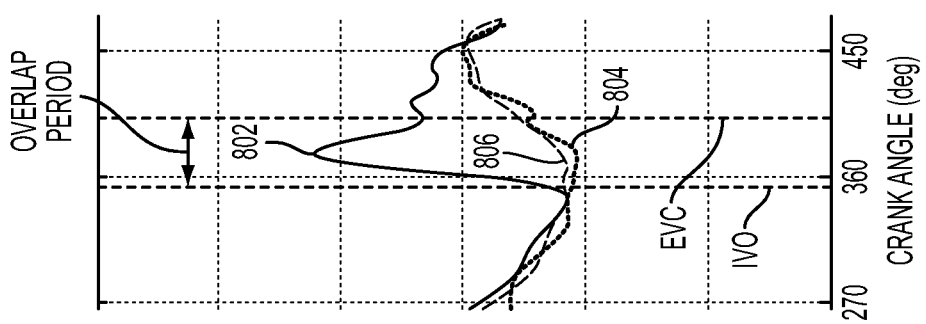
FIG. 8 is a comparison plot of cylinder number one exhaust pressure for three different exhaust manifolds coupled to an engine at different times.

Referring now to FIG. 8, a comparison plot of cylinder number one exhaust pressure for three different exhaust manifolds that are coupled to an engine at different times is shown. In particular, exhaust pressure for cylinder number one during a crankshaft angular region where cylinder number one intake and exhaust valves are simultaneously open is shown. The intake and exhaust valve overlap period is indicated by the vertical dashed lines. The left side dashed line represents intake valve opening (IVO) time. The right side dashed line represents exhaust valve closing (EVC) timing.

Pressure trace 802 represents exhaust pressure for the engine when a log type manifold is coupled to the engine. During the overlap period, pressure trace 802 is higher than pressure traces 804 and 806. Higher exhaust pressures can increase cylinder residuals and decrease cylinder volumetric efficiency. Thus, for cylinder number one, the log manifold exhibits pressures that are less desirable than pressure traces 804 and 806.

Pressure trace 804 represents exhaust pressure for an engine that is configured to couple engine cylinders 270 crankshaft degrees apart. Pressure trace 806 represents exhaust pressure produced by cylinder number one in a right hand manifold that couples at least one pair of cylinders that are separated by 90 crankshaft degrees in an engine combustion order (e.g., the manifold of FIGS. 4-5). Pressure trace 804 is significantly lower than pressure trace 802. Further, pressure trace 804 is slightly lower than pressure trace 806. However, when an exhaust manifold coupling cylinders 270 crankshaft degrees apart is coupled to an engine described in FIG. 2 manifold packaging may be cumbersome.

Pressure trace 806 represents exhaust pressure for the engine when the exhaust manifold of FIGS. 4-5 is coupled to the engine. During the intake and exhaust valve overlap period, pressure trace 804 is less than pressure trace 806 but it is a little higher than pressure trace 806. Thus, for cylinder number one, FIG. 8 indicates exhaust backpressure can be reduced by coupling either the exhaust manifold of FIGS. 4-5 or an exhaust manifold that separates engine cylinders by 270 crankshaft degrees.

Figure 9:
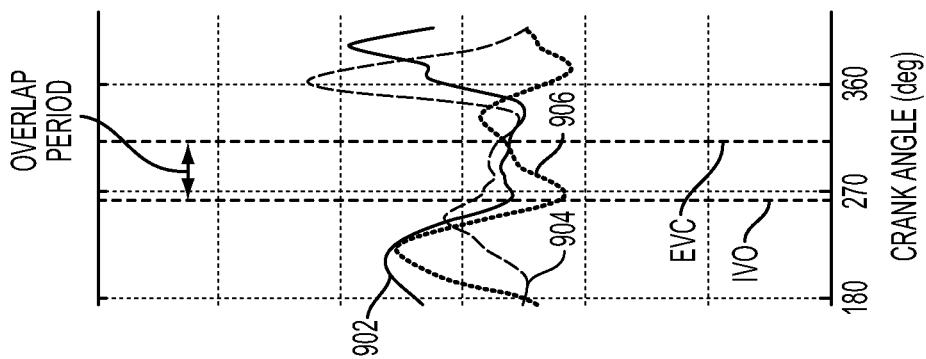
FIG. 9 is a comparison plot of cylinder number two exhaust pressure for three different exhaust manifolds coupled to an engine at different times.

Referring now to FIG. 9, a comparison plot of cylinder number two exhaust pressure for three different exhaust manifolds that are coupled to an engine at different times is shown. In particular, exhaust pressure for cylinder number two during a crankshaft angular region where cylinder number two intake and exhaust valves are simultaneously open is shown. The intake and exhaust valve overlap period is indicated by the vertical dashed lines. The left side dashed line represents intake valve opening (IVO) time. The right side dashed line represents exhaust valve closing (EVC) timing.

Pressure trace 902 represents exhaust pressure for the engine when a log type manifold is coupled to the engine. During the overlap period, pressure trace 902 is higher than pressure trace 906 but lower than pressure trace 904. Thus, for cylinder number two, the log manifold exhibits pressures that are improved over one type of exhaust manifold.

Pressure trace 904 represents exhaust pressure for an engine that is configured to couple engine cylinders 270 crankshaft degrees apart. Pressure trace 904 is higher than pressure trace 902 and significantly higher than pressure trace 906.

Pressure trace 906 represents exhaust pressure produced by cylinder number two in a right hand manifold that couples at least one pair of cylinders that are separated by 90 crankshaft degrees in an engine combustion order (e.g., the manifold of FIGS. 4-5). During the overlap period, pressure trace 906 is less than pressure both pressure trace 904 and pressure trace 902. Thus, for cylinder number two, FIG. 9 indicates exhaust backpressure can be reduced by coupling the exhaust manifold of FIGS. 4-5 to the engine.

Figure 10:
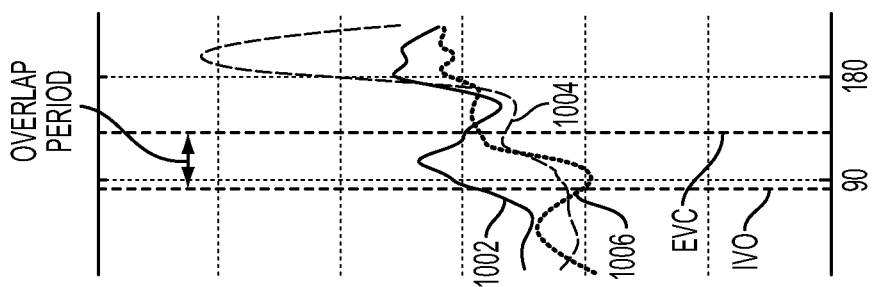
FIG. 10 is a comparison plot of cylinder number three exhaust pressure for three different exhaust manifolds coupled to an engine at different times.

Referring now to FIG. 10, a comparison plot of cylinder number three exhaust pressure for three different exhaust manifolds that are coupled to an engine at different times is shown. In particular, exhaust pressure for cylinder number three during a crankshaft angular region where cylinder number three intake and exhaust valves are simultaneously open is shown. The intake and exhaust valve overlap period is indicated by the vertical dashed lines. The left side dashed line represents intake valve opening (IVO) time. The right side dashed line represents exhaust valve closing (EVC) timing.

Pressure trace 1002 represents exhaust pressure for the engine when a log type manifold is coupled to the engine. During the overlap period, pressure trace 1002 is higher than pressure trace 1004 and pressure trace 1006. Thus, for cylinder number three, the log manifold exhibits pressures that are higher as compared to the other two manifolds.

Pressure trace 1004 represents exhaust pressure for an engine that is configured to couple engine cylinders 270 crankshaft degrees apart. Pressure trace 1004 is higher than pressure trace 1006 for most of the overlap interval but is consistently lower than pressure trace 1002.

Pressure trace 1006 represents exhaust pressure produced by cylinder number three in a right hand manifold that couples at least one pair of cylinders that are separated by 90 crankshaft degrees in an engine combustion order (e.g., the manifold of FIGS. 4-5). In this example, the exhaust from cylinder number three is combined with the exhaust of cylinder number four. Thus, the output of cylinder number three is coupled to a cylinder that is 270 crankshaft degrees apart in the engine combustion order of 1-5-4-8-6-3-7-2. During the intake and exhaust valve overlap period, pressure trace 1006 is less than pressure both pressure trace 1004 and pressure trace 1002 for most of the overlap period. However, near EVC pressure trace 1006 increases above pressure trace 1004.

Thus, for cylinder number three, FIG. 10 indicates exhaust backpressure can be reduced by coupling the exhaust manifold of FIGS. 4-5 to the engine.

Figure 11:
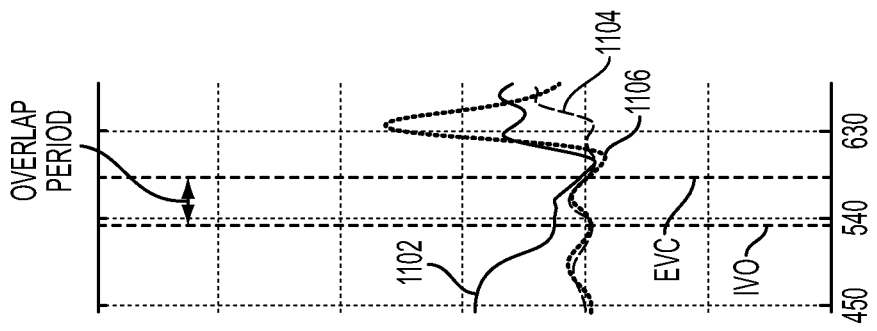
FIG. 11 is a comparison plot of cylinder number four exhaust pressure for three different exhaust manifolds coupled to an engine at different times.

Referring now to FIG. 11, a comparison plot of cylinder number four exhaust pressure for three different exhaust manifolds that are coupled to an engine at different times is shown. In particular, exhaust pressure for cylinder number four during a crankshaft angular region where cylinder number four intake and exhaust valves are simultaneously open is shown. The intake and exhaust valve overlap period is indicated by the vertical dashed lines. The left side dashed line represents intake valve opening (IVO) time. The right side dashed line represents exhaust valve closing (EVC) timing.

Pressure trace 1102 represents exhaust pressure for the engine when a log type manifold is coupled to the engine. During the overlap period, pressure trace 1102 is higher than pressure trace 1104 and pressure trace 1106. Thus, for cylinder number four, the log manifold exhibits pressures that are higher as compared to the other two manifolds.

Pressure trace 1104 represents exhaust pressure for an engine that is configured to couple engine cylinders 270 crankshaft degrees apart. Pressure trace 1104 is higher than pressure trace 1106 for most of the overlap interval but is consistently lower than pressure trace 1102.

Pressure trace 1106 represents exhaust pressure for the engine when the exhaust manifold of FIGS. 4-5 is coupled to the engine. During the intake and exhaust valve overlap period, pressure trace 1106 is less than pressure both pressure trace 1104 and pressure trace 1102 for most of the overlap period. However, near EVC pressure trace 1106 increases slightly above pressure trace 1104. Thus, for cylinder number four, FIG. 11 indicates exhaust backpressure can be reduced by coupling the exhaust manifold of FIGS. 4-5 to the engine.

When pressure traces for cylinders 1-4 are considered as a whole it becomes clear that the manifold of FIGS. 4-5 provides lower back pressure than a log manifold or a manifold that separates exhaust from all cylinders of the cylinder bank by 270 crankshaft degrees before gases from cylinders closer in a combustion order are combined. As a result, engine breathing may be improved and engine air-fuel mixtures may be improved.

Figure 12:
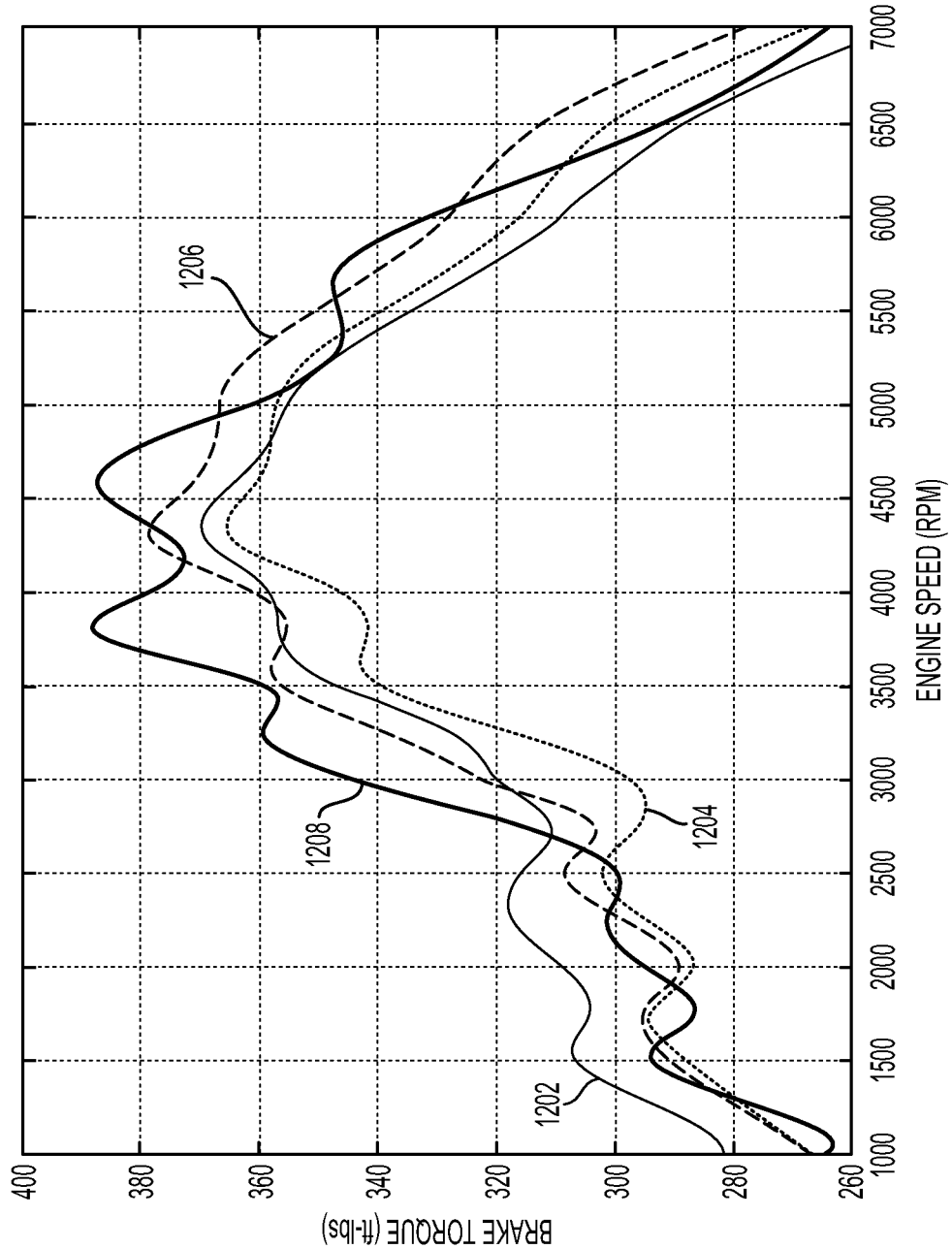
FIG. 12 is a plot of different engine torques for comparing different engine system configurations.

Referring now to FIG. 12, is a plot of different engine torques for comparing different engine system configurations. The plot has an X-axis that represents engine speed. The plot has a Y-axis of engine brake torque in units of ft-lbs. Trace 1202 represents engine torque for a base engine configuration with an intake cam that has a 240 crankshaft degree intake valve opening period. Trace 1202 exhibits good low speed torque but torque decreases as engine speed increases.

Trace 1204 represents engine torque for the same engine with a 260 crankshaft degree intake valve opening period. Trace 1204 shows a reduction in engine torque as compared to trace 1202 except at engine speeds above 4500 RPM. The reduction in performance may be attributed to an increased amount of push-back at lower engine speeds. For example, at lower engine speeds the longer valve duration can reduce engine torque by pushing a portion of the cylinder charge from the engine as the piston rises in the cylinder. Thus, a longer duration cam by itself yields performance trade-offs.

Trace 1206 represents an engine torque for the same engine with a 260 crankshaft degree intake valve opening period and the exhaust manifolds described in FIGS. 4-7. Trace 1206 shows a significant torque increase over the base cam configuration as illustrated by trace 1202. Trace 1206 shows a slight reduction in engine torque at lower engine speeds; however, a significant torque increase is provided by combining the manifolds of FIGS. 4-7 with a cam that has a longer intake valve opening duration (e.g. greater than 250 crankshaft degrees or greater than 260 crankshaft degrees).

Trace 1208 represents engine torque for the same engine with a 260 crankshaft degree intake valve opening period, the manifolds of FIGS. 4-7, and increased length intake manifold runners (e.g., at least 490 mm primary runner length). Trace 1208 shows a significant engine torque improvement over the configurations of traces 1202-1206, especially at mid-range engine speeds.

Thus, FIG. 12 shows that engine performance may be increased significantly by a combination of a longer duration cam (e.g. an intake valve opening duration of more than 250 crankshaft degrees or an intake valve opening duration of more than 260 crankshaft degrees) and pulse separation manifolds as shown in FIGS. 4-7. Further, increasing the intake manifold runner length provides an additional performance improvement.

FIG. 13 is a plot of a flowchart of a method for operating an engine. At 1302, routine 1300 determines engine operating conditions. Engine operating conditions may include but are not limited to engine speed, engine load, engine coolant temperature, engine air amount, and engine intake throttle position. Routine 1300 proceeds to 1304 after engine operating conditions are determined.

At 1304, routine 1300 judges whether or not an engine stop is requested. An engine stop request may be initiated by an operator key request or from a controller (e.g., a hybrid vehicle controller). If routine 1300 judges an engine stop request is present, routine 1300 proceeds to 1306. Otherwise, routine 1300 proceeds to 1310.

At 1306, routine 1300 commands the cam to the cam's mid-position. In one example, the cam may return its mid-position by spring assist. From the mid-position, the cam may be advanced or retarded. Routine 1300 proceeds to 1308 after the cam is commanded to its mid-position.

At 1308, routine 1300 deactivates fuel and spark. In one example, spark may be stopped after fuel. Routine 1300 proceeds to exit after fuel and spark are deactivated.

At 1310, routine judges whether the engine is operating during cold start conditions. In one example, a cold start may be determined from engine coolant temperature and/or an amount of time or combustion events since engine stop. If routine 1300 judges that the engine is operating in cold start conditions, routine 1300 proceeds to 1312. Otherwise, routine 1300 proceeds to 1320.

At 1312, routine 1300 holds the cam in a mid-position. The cam can be held in the mid-position by leaving a holding pin engaged. Further, valve positioning commands may be inhibited when the cam is held in a mid-position.

During cold start, operating an engine LIVC can reduce the heat of compression, reduce fuel vaporization, reduce cylinder charge motion, and increase intake manifold pressure. As such, cold start engine emissions can be increased when LIVC is during an engine cold start and idle. Further, it can be difficult to index a cam from a retarded state to an advanced state during a cold start because oil pressure may not increase as fast as desired to achieve a desired level of combustion stability. Therefore, positioning a can in a mid-position where intake valve closing time is not late (e.g., within 70 crankshaft degrees of bottom dead center intake stroke) during a cold start can improve exhaust gas temperatures and combustion stability. By positioning the cam in a mid-position, engine cold start and part-throttle LIVC conditions can be decoupled. Routine 1300 proceeds to 1314 after holding the cam in the mid-position.

At 1314, routine 1300 holds the engine CMCVs in a closed position. The CMCVs are held closed to restrict air flow to engine cylinders and promote charge motion at lower engine speeds to improve combustion stability. CMCVs may be normally closed valves, so in some examples, no commands are issued to the CMCV valves. The CMCVs may be held closed by simply limiting commands to the CMCV.

At 1316, routine 1300 retards engine spark and increases cylinder air flow over warm idle conditions by elevating engine speed. Further, in some examples, engine cylinders may be operated lean during a cold start to reduce hydrocarbons. In some examples, the engine spark is retarded until a catalyst in the vehicle exhaust system is above a threshold temperature. Routine 1300 proceeds to exit after retarding engine spark.

At 1320, routine 1300 judges whether or not the engine is operating at a partial throttle condition (e.g., the throttle is opened 10% from a closed throttle position). In one example, routine judges the engine is operating at a part throttle position when a throttle position sensor indicates that the position of a throttle located in the intake system is not in a closed position. In another example, routine 1300 judges that the engine is operating at a part throttle condition in response to an inducted engine air amount that is greater than a threshold amount. If routine 1300 judges that the engine is operating at a part throttle condition, routine 1300 proceeds to 922. Otherwise, routine 1300 proceeds to 1326.

At 1322, routine 1300 retards cam timing so that there is late intake valve closing (LIVC). In one example, routine 1300 provides LIVC valve timing (e.g., the intake valve closes 70-110 crankshaft degrees after bottom dead center intake stroke) when engine load is greater than a first threshold and less than a second threshold. If engine load is greater than the second threshold, routine 1300 advances intake valve timing so that the intake valve closes earlier than 70 crankshaft degrees after bottom dead center intake stroke. Routine 1300 proceeds to 1324 after retarding cam timing.

It should be noted that LIVC between 90 and 110 crankshaft degrees can degrade combustion stability; however, combustion stability can be improved with closed CMCV valves during such conditions.

At 1324, routine 1300 holds charge motion control valves (CMCV) closed until the engine load exceeds a threshold load. In one example, engine charge motion control valves are configured in a normally closed position. The charge motion control valves can be commanded open by an electrical or vacuum actuator. When engine load exceeds the threshold load, the charge motion control valves are opened so that engine breathing improves at higher engine loads. Routine 1300 proceeds to exit after adjusting CMCV position.

At 1326, routine 1300 judges whether or not the engine is operating at low speed wide open throttle (WOT). In one example, the engine may be considered to be operating at WOT when engine load is above a threshold load irrespective of the throttle position. In another example, the engine may be considered to be at WOT when a position of the throttle exceeds a threshold amount.

At 1328, routine 1300 advances cam timing so that there is late intake valve closing (LIVC) not provided. Routine 1300 proceeds to 1330 after advancing cam timing.

At 1330, routine 1300 holds charge motion control valves (CMCV) closed until the engine load exceeds a threshold load. In one example as discussed above, engine charge motion control valves are configured in a normally closed position. When engine load exceeds the threshold load, the charge motion control valves are opened so that engine breathing improves at higher engine loads. Routine 1300 proceeds to exit after adjusting CMCV position.

At 1332, routine 1300 advances intake valve closing time from the mid-position of the cam actuator if the engine is not operating at part throttle LIVC operating conditions. In one example, the cam timing is adjusted according to empirically determined cam timings that are based on engine speed and engine load. Routine 1300 proceeds to 932 after cam timing is adjusted.

At 1334, routine 1300 opens CMCVs. In one example, CMCVs are opened to improve engine breathing at higher engine speeds and loads. For example, when engine speed is greater than a threshold and when engine load is greater than a threshold, CMCVs are opened. It should be noted that CMCVs may be opened at lower engine speeds when engine load is higher, and CMCVs may be held closed at higher engine speeds when engine load is lower. Routine 1300 proceeds to exit after CMCVs are operated according to a predetermined schedule (e.g., according to an engine speed and engine load schedule).

As will be appreciated by one of ordinary skill in the art, the routine described in FIG. 9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
    an exhaust manifold including a first Y-pipe, said first Y-pipe including a first pipe and a second pipe, said first pipe and said second pipe coupled to a confluence pipe, said first pipe extending to solely engage exhaust ports of first and second cylinders of an engine cylinder bank, said second pipe extending to solely engage exhaust ports of third and fourth cylinders of said engine cylinder bank, said first and second cylinders 90 crankshaft degrees apart in an engine firing order, the first pipe coupled to a third pipe engaging an exhaust port of the first cylinder and a fourth pipe engaging an exhaust port of the second cylinder, the third pipe and the fourth pipe combining into the first pipe at a location before the first pipe reaches a location of the third cylinder in a direction of exhaust flow to a rear of an engine.

2. The engine system of claim 1, wherein said first pipe branches into a second Y-pipe before engaging exhaust ports of said first and second cylinders, and where said confluence pipe is coupled to a pipe including a catalyst.

3. The engine system of claim 2, wherein said second pipe branches into a third Y-pipe before engaging exhaust ports of said third and fourth cylinders, and wherein said third and fourth cylinders are 270 crankshaft degrees apart in said engine firing order.

4. The engine system of claim 2, wherein said first pipe is a confluence pipe of the third pipe and the fourth pipe.

5. The engine system of claim 3, wherein said second pipe is a confluence pipe of a fifth pipe and a sixth pipe.

6. The engine system of claim 4, wherein said first pipe and said second pipe are configured to direct engine exhaust in a direction from a front of said engine to the rear of said engine, and wherein said first pipe extends to said rear of said engine.

7. The engine system of claim 1, further comprising an intake cam having an intake valve opening duration of at least 260 crankshaft degrees, said intake cam capable of opening valves that direct cylinder contents to said exhaust manifold.

8. The engine system of claim 1, further comprising a charge motion control valve and a mid-locking position camshaft phase actuator, said charge motion control valve and said mid-locking position camshaft phase actuator adjusting flow to cylinders in communication with said exhaust manifold.

9. An engine system, comprising:
    an engine including a camshaft with at least one intake valve lobe having an intake valve opening duration of at least 260 crankshaft degrees;
    a mid-position locking camshaft phasor coupled to said camshaft and configured to adjust a cam timing of a cylinder bank of said engine; and
    an exhaust manifold coupled to said engine and including a first Y-pipe, said first Y-pipe including a first pipe and a second pipe, said first pipe and said second pipe coupled to a confluence pipe, said first pipe extending to solely engage exhaust ports of first and second cylinders of said engine cylinder bank, said second pipe extending to solely engage third and fourth cylinders of said engine cylinder bank, said first and second cylinders 90 crankshaft degrees apart in an engine firing order.

10. The engine system of claim 9, further comprising a controller, said controller configured with instructions to lock said camshaft in a mid-position during an engine stop.

11. The engine system of claim 10, further comprising a charge motion control valve for controlling air flow to said engine cylinder bank.

12. The engine system of claim 11, wherein said controller includes further instructions for closing said charge motion control valve during engine idle conditions and opening said charge motion control valve during wide open throttle conditions.

13. The engine system of claim 9, wherein a diameter of said first pipe is greater than a diameter of said third pipe, and wherein the diameter of said first pipe is greater than a diameter of said fourth pipe.

14. The engine system of claim 9, wherein said exhaust manifold is coupled to an eight cylinder V type engine.

15. An engine system, comprising:
    an engine including a camshaft with at least one intake valve lobe having an intake valve opening duration of at least 260 crankshaft degrees;
    a mid-position locking camshaft phasor coupled to said camshaft and configured to adjust a cam timing of a cylinder bank of said engine;
    a first exhaust manifold coupled to said engine and including a first Y-pipe, said first Y-pipe including a first pipe and a second pipe, said first pipe and said second pipe coupled to a confluence pipe, said first pipe extending to solely engage exhaust ports of first and second cylinders of a first engine cylinder bank, said second pipe extending to solely engage third and fourth cylinders of said first engine cylinder bank, said first and second cylinders 90 crankshaft degrees apart in an engine firing order; and
    a second exhaust manifold coupled to said engine and including a second Y-pipe, said second Y-pipe including a third pipe and a fourth pipe, said third pipe and said fourth pipe coupled to a confluence pipe, said third pipe extending to solely engage exhaust ports of first and second cylinders of a second engine cylinder bank, said fourth pipe extending to solely engage third and fourth cylinders of said second engine cylinder bank, said first and second cylinders of the second engine cylinder bank 270 crankshaft degrees apart in said engine firing order, said third and fourth cylinders of the second engine cylinder bank 270 crankshaft degrees apart in said engine firing order.

16. The engine system of claim 15, further comprising a controller, wherein said controller includes instructions for locking said mid-position locking camshaft phasor in a mid-position during an engine stop.

17. The engine system of claim 16, wherein said controller includes further instructions for holding said mid-position locking camshaft phasor in said mid-position during a cold start idle condition, said controller including further instructions for retarding said mid-position locking camshaft phasor from said mid-position during a warm idle condition.

18. The engine system of claim 16, wherein said controller includes further instructions for opening a charge motion control valve during wide open throttle conditions.

19. The engine system of claim 16, further comprising a charge motion control valve for controlling air flow to said first and second engine cylinder banks.

20. The engine system of claim 19, wherein said controller includes further instructions for holding the charge motion control valve closed during at least some part-load conditions.

* * * * *